(12) United States Patent
English et al.

(10) Patent No.: US 7,587,678 B1
(45) Date of Patent: Sep. 8, 2009

(54) EMAIL-BASED CUSTOMER SUPPORT MANAGEMENT SYSTEM

(75) Inventors: Paul M. English, Winchester, MA (US); James D. Giza, Sutton, MA (US)

(73) Assignee: Kayak Software Corporation, Norwalk, CT (US)

( * ) Notice: Subject to any disclaimer, the term of this patent is extended or adjusted under 35 U.S.C. 154(b) by 190 days.

(21) Appl. No.: 11/279,713

(22) Filed: Apr. 13, 2006

(51) Int. Cl.
G06F 3/00 (2006.01)
G06F 15/16 (2006.01)

(52) U.S. Cl. ...................................... 715/752; 709/206
(58) Field of Classification Search ................. 715/752; 709/206
See application file for complete search history.

(56) References Cited

U.S. PATENT DOCUMENTS

| | | | |
|---|---|---|---|
| 5,778,372 A | 7/1998 | Cordell et al. | |
| 6,018,774 A | 1/2000 | Mayle et al. | |
| 6,055,564 A * | 4/2000 | Phaal | 709/207 |
| 6,449,634 B1 * | 9/2002 | Capiel | 709/206 |
| 6,501,834 B1 * | 12/2002 | Milewski et al. | 379/93.24 |
| 6,618,747 B1 * | 9/2003 | Flynn et al. | 709/206 |
| 6,769,012 B1 * | 7/2004 | Liu et al. | 709/204 |
| 6,920,564 B2 * | 7/2005 | Decuir | 713/189 |
| 7,100,116 B1 | 8/2006 | Shafrir et al. | |
| 7,225,230 B1 * | 5/2007 | Knoerle et al. | 709/206 |
| 2002/0087646 A1 * | 7/2002 | Hickey et al. | 709/206 |
| 2004/0039778 A1 * | 2/2004 | Read et al. | 709/203 |
| 2005/0066005 A1 * | 3/2005 | Paul | 709/206 |
| 2005/0091600 A1 * | 4/2005 | Yamamoto et al. | 715/752 |
| 2005/0216848 A1 * | 9/2005 | Thompson et al. | 715/753 |
| 2006/0036694 A1 * | 2/2006 | Pricken et al. | 709/206 |
| 2006/0053198 A1 * | 3/2006 | Pricken et al. | 709/206 |
| 2006/0248147 A1 * | 11/2006 | Hill et al. | 709/206 |
| 2006/0259556 A1 * | 11/2006 | Auhagen | 709/206 |
| 2007/0094217 A1 * | 4/2007 | Ronnewinkel | 706/52 |

FOREIGN PATENT DOCUMENTS

JP     2004-288111     * 10/2004

* cited by examiner

*Primary Examiner*—Tadesse Hailu
*Assistant Examiner*—Nicholas S Ulrich
(74) *Attorney, Agent, or Firm*—Fenwick & West LLP

(57) ABSTRACT

A customer support system is provided that integrates with a legacy email system. The customer support system receives customer inquiries via a feedback form, formats the inquiries into emails and routes the emails to selected employees. A dynamic status indicator is incorporated into each email that indicates the status of the customer's inquiry. The value of the status indicator is resolved at the time an employee opens or displays the email for viewing. All customer inquiries and employees responses are individually tracked and maintained in a database for analysis and reporting.

25 Claims, 6 Drawing Sheets

FIG. 2

[dharris] I've been using Kayak for Air and Hotel  Feedback-New jim@oilwiki.com <10320.ae5@feedback.kayak.com> to fe Hide options 9:39 pm (0 minutes ago)
From: jim@oilwiki.com <10320.ae5@feedback.kayak.com>  Mailed-By: kayak.com
Reply-To: 10320.ae5@feedback.kayak.com
To: feedback-team@kayak.com
Date: Mar 11, 2006 9:39 PM
Subject: [dharris] I've been using Kayak for Air and Hotel
External images from this sender are always displayed. Don't display from now on.
Reply | Reply to all | Forward | Print | Add sender to Contacts list | Delete this message |
Report phishing | Show original | Message text garbled?

Open jim@oilwiki.com rec=[1] bak=[1] rat=[9] Referred by Blog

I've been using Kayak for Air and Hotel and just now
discovered that it's also useful for Car. Thanks so much!

Mozilla/4.0 (compatible; MSIE 6.0; Windows NT 5.1; SV1; .NET CLR 1.1.4322)
Sat Mar 11 21:38:53 EST 2006

*FIG. 4*

[dharris] I've been using Kayak for Air and Hotel  Inbox Feedback-New jim@oilwiki.com to feedback-team  Hide options 9:39 pm (11 minutes ago)
From: jim@oilwiki.com <10320.ae5@feedback.kayak.com>  Mailed-By: kayak.com
Reply-To: 10320.ae5@feedback.kayak.com
To: feedback-team@kayak.com
Date: Mar 11, 2006 9:39 PM
Subject: [dharris] I've been using Kayak for Air and Hotel
External images from this sender are always displayed. Don't display from now on.
Reply | Reply to all | Forward | Print | Add sender to Contacts list | Delete this message |
Report phishing | Show original | Message text garbled?

Active jim@oilwiki.com rec=[1] bak=[1] rat=[9] Referred by Blog

I've been using Kayak for Air and Hotel and just now
discovered that it's also useful for Car. Thanks so much!

Mozilla/4.0 (compatible; MSIE 6.0; Windows NT 5.1; SV1; .NET CLR 1.1.4322)
Sat Mar 11 21:38:53 EST 2006

*FIG. 5*

Your Kayak.com feedback from Today  heatingoilbuddy

☆ Jim Giza, Kayak.com Director of Technology <10320.ae5@feedback.kaya  Hide options  9:42 pm (11 hours ago)
From: Jim Giza, Kayak.com Director of Technology <10320.ae5@feedback.kayak.com> Mailed-By: kayak.com
To: jim@oilwiki.com
Date: Mar 11, 2006 9:42 PM
Subject: Your Kayak.com feedback from Today
Reply | Reply to all | Forward | Print | Add sender to Contacts list | Delete this message | Report phishing | Show original |
Message text garbled?

Hello,

We appreciate you using Kayak and are psyched that you've discovered it's
applicability for Cars! After you've used it for a while, please send us
your thoughts. Thanks.

Jim

Was this response helpful? Yes or No

---

I've been using Kayak for Air and Hotel and just now
discovered that it's also useful for Car. Thanks so much!

EMAIL-BASED CUSTOMER SUPPORT MANAGEMENT SYSTEM

FIELD OF THE INVENTION

The present invention relates to systems that provide customer support using networked communications.

BACKGROUND OF THE INVENTION

Most companies have both customer support and product development departments. Generally, the customer support department operates entirely separate from product development. The customer support department focuses on responding to customers' questions and complaints about currently available products and services. The product development department focuses not on the problems or features of the current products and services, but instead on developing the next generation or version of such products and services. One traditional reason given for the separation of customer support and product development is that if the product development team were busy responding to customer issues, the product development cycle would come to a standstill, since more time would be spent responding to questions and comments than developing product. Another reason given for the separation is that it is better to have trained and polished customer support agents deal with all customer-facing situations in order to project an appropriate and consistent corporate image. Product development personnel are not typically trained to handle customer inquires.

As a result of this separation, the valuable customer information that flows into the customer support organization from the customers is either not harvested or, at best, is culled and summed into generalized graphs and statistics showing levels of customer satisfaction with the current products. The nuggets of customer-driven insight about improvements or requested features are lost in this data aggregation process.

Further, because the direct feedback from customers is not made available to the product developers, companies instead turn to customer focus groups, surveys and other information gathering tasks in order to understand customer needs and wants. However, these groups only occasionally connect the actual product development engineers with the customers. Instead, such groups are managed by marketing teams who then compile and report their finding to product managers.

One solution currently used to manage customer feedback is a dedicated customer support software application. The customer support software application is designed primarily for tracking customer issues, logging complaints, accessing technical support documentation, and creating service metrics describing customer support performance. One problem with dedicated support applications is that they are by definition a separate application from other tools and software used by the enterprise's employees. There are several problems with this approach. First, a license must be purchased for the application (either per user, site, or other usage model), and continued investment must be made to maintain the dedicated application through upgrades, maintenance, additional hardware and so forth. Thus a dedicated customer support application can pose a significant additional investment for most companies. Second, employees must be separately trained on the application, thereby resulting in further costs and drain on resources.

Third, and perhaps most importantly, the inclusion of yet another application in the set of applications used by employees makes it that much more unlikely to be used frequently and properly. This is particularly true where the additional application is considered by employees as not part of the "core" applications they use in their primary job function, such as word processors, spreadsheets, programming environments, and so forth. Thus, adding a further specialized application to the employees' application suite will typically result in employees being less responsive.

SUMMARY OF THE INVENTION

The present invention provides a methodology and system for managing customer feedback using a legacy email system. In one aspect of the invention, emails from customers pertaining to support issues are received into an email system via an email submission interface. The email system includes a feedback manager to which the emails are delivered. The feedback manager formats each received email to include a dynamic status indicator in the email. The feedback manager then sends the email to one, some or all employees of the enterprise. The dynamic status indicator is used to indicate the status of a response to the customer's email, for example indicating whether or not the email has been responded to by any employee. The status indicator is dynamic in that its value is resolved at the time email that contains it is rendered for display by an email client, e.g., the email is opened by an employee for display or reading. As an example, the dynamic status indicator can take the values "Open" and "Active"; the former indicating that no one has yet responded to the customer's email, the latter indicating that some employee has responded. Thus, one benefit is that each time some employee accesses the customer's email, the current value of the dynamic status indicator is resolved and included in the displayed email. In one embodiment the dynamic status indicator is an image file containing an image indicative of status; the image can be of a word such as the foregoing values, or can be other visual representations of the status.

When the email is rendered for display by an email client of a particular employee, the value of the dynamic status indicator is determined. The value will vary depending on whether any other employee has already responded to the email by the time the particular employee has attempted to open the email with the email client. If the customer's email has already been responded to by some employee, the dynamic status indicator will have a value so indicating, and will be rendered by the email client with this value. For example, if the customer's email has already been responded to, then the email client will display the email with the indicator "Active" (e.g., as an image, text, or even audible tone). This informs the particular employee that there is no need for him to further respond to the customer, as a response has already been provided. However, if the email client renders the email with the indicator set to "Open," then this indicates to the employee that a response has not yet been provided; the employee is thus in a position to respond to the customer's email.

Once a response to the customer email is sent to the customer, the feedback management system tracks that response, and updates the value of the dynamic status indicator; e.g., from "Open" to "Active." This allows other employees to quickly determine in the context of their respective email clients, which customer emails have and have not been responded to since the updated value of the dynamic status indicator will be used the next time an employee accesses the customer's email for display.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 2 is an example feedback form.

FIG. 4 is an example of a formatted customer email, with the "Open" status.

FIG. 5 is an example of a formatted customer email, with the "Active" status.

FIG. 6 is an example of a response email from an employee.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

System Overview

Figure 1:
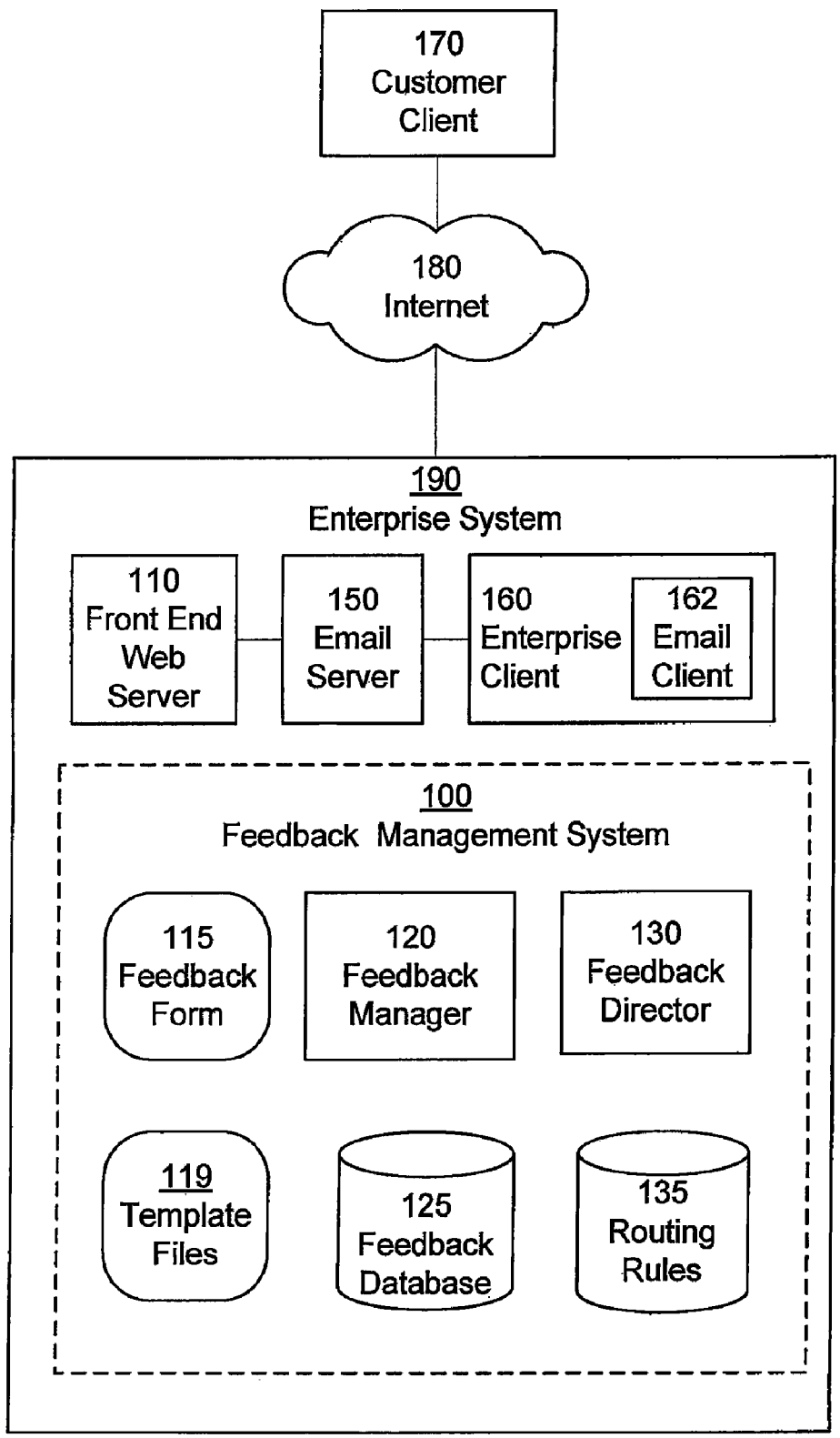
FIG. 1 is block diagram of the software architecture of one embodiment of the present invention.

Referring now to FIG. 1, there is shown the software architecture of an embodiment of a feedback management system 100 in accordance with one embodiment of present invention. This embodiment of the feedback management system 100 includes a feedback manager 120, a feedback database 125, a feedback form 115, a number of template files 119, a feedback director 130, a database 135 of routing rules, and some number of enterprise clients 160.

The system 100 operates in an enterprise computer system 190 including a front end web server 110 and a legacy email server system 150. The enterprise system 190 includes a local area network, with the foregoing applications and servers executing on server, workstation, or desktop class computers, as desired by the system administrator. The enterprise system 190 is coupled to the Internet 180 via standardized networking protocols.

Customer clients 170 communicate with the feedback management system 100 via email protocols and web protocols, as are known in the art. A customer client 170 will thereby typically include at least a web browser (which provides access to web-based email systems, e.g., Yahoo Mail, Google Gmail, Hotmail) and may also include a separate email client application (e.g., Eudora, Thunderbird, Outlook). Clients 170 can be any type of computer adapted to communicate with the enterprise system 190 via the Internet, including any form factor, such as desktop, notebook, smartphone, personal digital assistant, and the like.

The front end web server 110 provides an interface for web communications via basic web protocols (e.g., HTTP and HTML), as well as support for further web-related protocols, including Java, JavaScript, XML, and the like. The web server 110 supports a website (not shown) for the enterprise system 190, through which customer clients can access web related content. The details of the website are not material to the invention.

Figure 2:
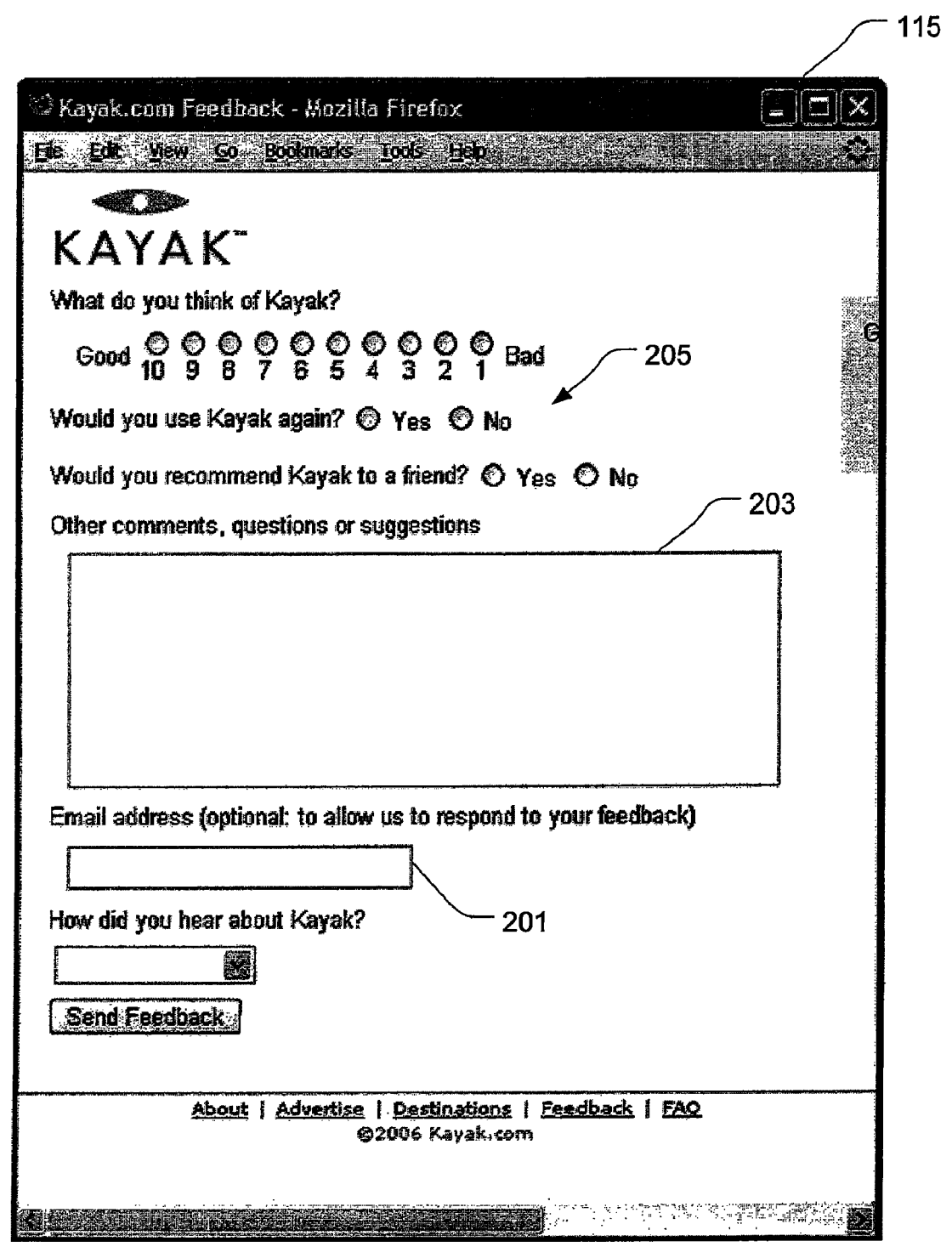

In one embodiment a feedback form 115 is provided by the web server 110 in conjunction with a web page of the website. FIG. 2 illustrates an example of a feedback form 115 as displayed in a client 170. The feedback form 115 is adapted to allow customers, via a client 170, to submit feedback, comments, questions, and the like. The feedback form 115 may be implemented in any programming code; one embodiment implements the feedback form 115 as a Java Server Page (JSP).

The feedback form 115 includes fields that capture information pertaining the customer's feedback, such as the customer email address 201 and text 203 of the customer's comment, and additional information helpful to handling the customer's comment, such as answers 205 to questions included in the form. Additional environmental variables can also be captured automatically without the customer's input, such as the type of browser the client 170 is using, which server or port the connection with the client 170 was made, the IP address of the client device (as well as related geocodes for the IP address), the pages of the website visited by the customer, a search history of the customer, and the like. There are no limitations on the type or amount of content collected in the feedback form 115 and the particular data collected is determined by the system administrator based on the enterprise's interests and information needs. The feedback form 115, when submitted by the client 170, generates a feedback email which contains the customer's feedback information and the additional data and variables, and is addressed to the feedback manager 120.

The feedback manager 120 is responsible for handling the customer's feedback email, logging the feedback email to the feedback database 125, and generating a new email to one or more employees of the enterprise based on the content of the feedback email. In generating the new email, the feedback manager 120 includes a dynamic status indicator in the email, and generates a unique tracking identifier (tracking ID, or TID) for tracking the particular customer's feedback and subsequent related emails. The feedback manager 120 preferably uses a template file 119 for generating the emails to the employees containing the customer's feedback. The details of the implementation of operation of the feedback manager 120 are further described below.

As mentioned above, the feedback manager 120 includes or embeds a dynamic status indicator (or more generally flag, or token) in the feedback email that is generated and forwarded to employees. In one embodiment, the feedback manager 120 embeds the dynamic status indicator in the email itself. The function of the dynamic status indicator is to indicate the status of the customer's feedback each time the indicator is resolved by the enterprise client's email application 162. In one embodiment, the status can be in one of two states, called "Open" or "Active." A status of "Open" means that at the time of this email message being rendered (e.g., displayed) by the employee's email client application 162, no other employee had yet responded to that customer's feedback email. A status of "Active" shows that the issue has been responded to by another employee. The terms "Open" and "Active" are merely exemplary of the semantics of the underlying states, and other terms can be used as well, such as "Current" and "Pending," or "Responded" and "Not Responded" and so forth.

The status indicators can be in a variety of different forms, including text, images, video, or audio clips. In one embodiment, the status indicators are image files (e.g., bitmaps, compressed or uncompressed), which are retrieved and rendered by the email client application 162 when the employee accesses the customer feedback email in such a manner that causes the email to be displayed. This can be done either by opening the email in a viewer, viewing the email in a preview window, or displaying the email in an inbox listing depending on the email client's rendering and display capabilities as well as the preference settings selected by the employee.

The foregoing embodiment uses only two states to designate the status of the customer's email. This approach considerably reduces the complexity of tracking the status of whether a customer's feedback has been responded to. Further, use of two-state status model ensures that employees are extremely prompt and proactive in responding to a customer's email. The addition of a third status that indicates an employee has taken responsibility for a response, but has not yet responded allows such an employee to actual delay making the response to later. This in turn operates to reduce the overall level of employee responsiveness to customer's concerns. However, in alternative embodiments, additional states/status levels may be used to track a customer's feedback and response.

The feedback database 125 stores the customer's feedback information as received from the feedback form 115 and augmented by the feedback form 115 manager, including the tracking ID. The feedback database 125 can be a relational or even flat file database. The database 125 stores the individual elements of the customer's feedback email as generated in the form (e.g., email address, text of comment, answers to questions, and the like) as well as optional environmental variables, the tracking ID, which employee (if any) the customer's email was assigned to, whether a reply to the customer's feedback was necessary or not, time and date information, geocoding, the current status of email, the type of message (e.g., original from customer, reply by an employee, reply by customer, and so forth).

The database 125 also provides reports on various aspects of how customer feedback is being handled. Example reports include a report of open issues, average response time per employee, total number of responses by each employees, various reports on customer ratings, and so forth.

The feedback director 130 operates in conjunction with the routing rules 135. The feedback director 130 uses the routing rules 135 to assign a received customer feedback to one or more employees. The routing rules 135 can be stored in a database or in a simple text file, depending on the implementation. If the content of the message matches at least one rule in the routing rules 135, then the employee or group email address associated with the rule will be used.

The routing rules 135 include several types of rules: content matching rules, assignment history rules, and scheduling rules. Content matching rules match any portion of the customer feedback message (e.g., comment, answers, ratings, environmental variables, search history) against key words, phrases, codes, or other constraints to determine to which employee or group of employees the email should be routed. Each matching rules identifies the particular keywords, etc. to be matched, and the email address, employee name, or list name of the desired recipient. For example, a routing rule may take the simplified form:

bill: login | password

This rule would indicate that any customer feedback email which contained the word "login" or "password" would have that feedback forwarded to the employee (or group) named "bill". More complex rules can easily be crafted, including any combination of Boolean operators on the content of the email, as well as using sophisticated relevancy based information-retrieval type scoring algorithms.

The scheduling rules distribute the emails based on time of day/day of week parameters, or other distribution parameters. The rules can also be structured to obtain any preselected allocation or distribution of emails amongst a target group of employees. These rules can be structured to ensure an even distribution of the customer emails among a group (e.g., by round robin, or random distribution), or some specific distribution. For example, the rules can be set up such that one group of employees designated by a particular email group address receives 60% of the customer emails, and the remaining 40% of the emails are distributed round robin to specific individual employees.

The assignment history rules consider the previous assignments of customer emails, and are used to make sure that particular employees or groups do not receive too many customer emails for handling. The assignment history rules may also be used to assign establish continuity of customer support. Where a new email is received from a customer who as previously submitted a feedback email, then the assignment rule can assign this new email to the employee who has previously responded the customer's earlier feedback.

In one embodiment, the rules are processed such that the content matching rules are first applied, followed by the scheduling and assignment history rules. If a content matching rule is satisfied, then the generated email is addressed to the identified employee or group; the scheduling rules are not used in this case, and the assignment history rules are optionally used. If a content matching rule is not satisfied, then both the scheduling and assignment history rules are used.

The email server 150 is configured as a standards-compliant email server and gateway, implementing email protocols such as POP, IMAP, SMTP, MAPI and the like. A suitable server 150 is Microsoft Corp.'s Exchange Server. The feedback manager 120 is assigned one or more designated domain names by which the email server 150 can route emails to the feedback manager 120.

The enterprise clients 160 are locally or remote connected computers (e.g., desktops, workstations, notebooks, etc.) used by employees of the enterprise. Each enterprise client 160 includes an email client application 162 which is configured to operate with the email server 150. A suitable email client includes Microsoft Corp.'s Outlook client application. While only a single enterprise client 160 is shown, it is understood that in practice there will many such clients 160 in an actual enterprise. Also, at least some of the enterprise clients 160 have access to the feedback director 130.

The feedback manager 120 and feedback director 130 may be implemented in any variety of computer programming languages; in one embodiment, they are implemented in PERL scripts.

The feedback management system 100 is adapted to manage customer support interactions between customer and employees of an enterprise. The feedback management system 100 can be used in any context where one set of people (e.g., customers) provides inquires (e.g., questions, comments) of another set (e.g., employees) and want timely responses. Accordingly, in the context the present invention, the term 'customer' broadly covers any type of person or user who makes an inquiry via a feedback management system 100. There is no requirement that a customer actually purchase anything from the enterprise, or have any business relationship at all with the enterprise. Further the feedback management system 100 can be used entirely within an enterprise. For example, the feedback management system 100 can be used to provide technical support for workers of an enterprise; in this embodiment, one group of employees (e.g., users) makes inquiries via the feedback management system 100, and another group of employees (e.g., technical support personnel), provide the responses. In this embodiment, the first group of employees are in effect the 'customers' of the second group of employees.

System Operation

Figure 3A:
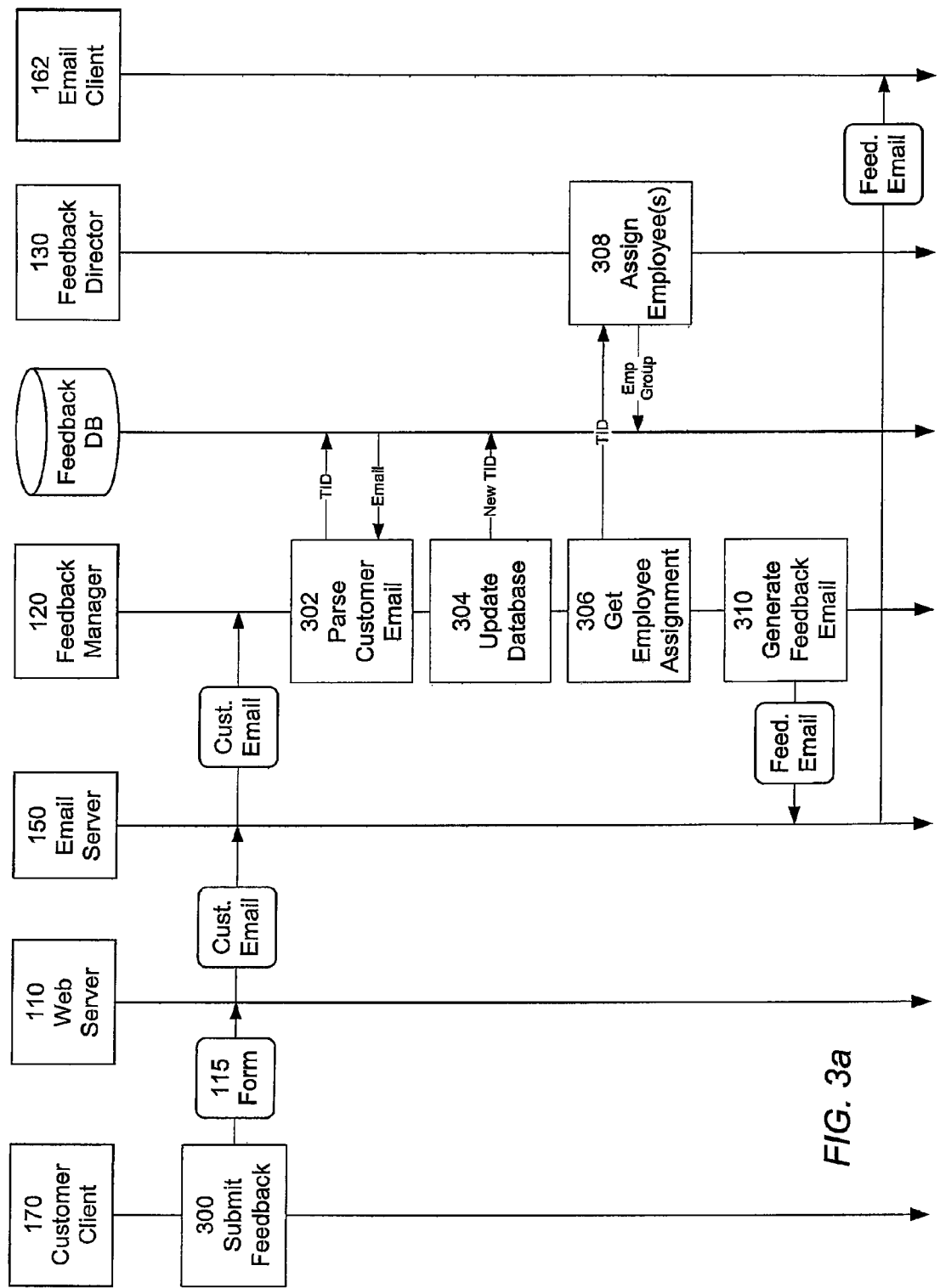
FIGS. 3a and 3b are an event trace of the methodology of the present invention.
Figure 3B:
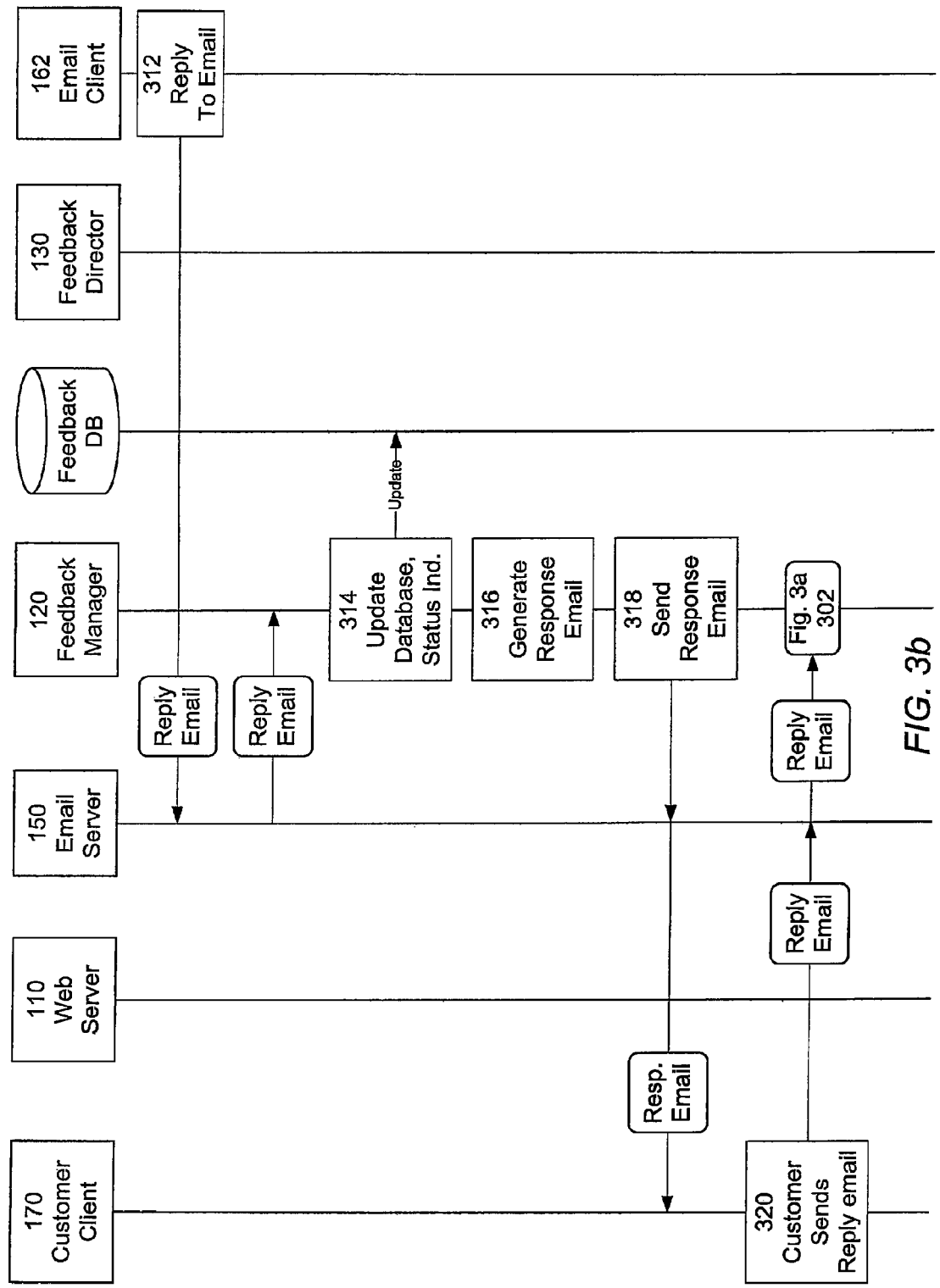

Referring now to FIGS. 3a and 3b, there is shown an event trace of the basic operation of the feedback management system 100. The steps shown are intentionally high level and not intended to represent individual computer programming instructions or operations, but rather the system inputs, behaviors, and output of the system elements described above, as well as high level inter-process or inter-module communication. Those of skill in the art will appreciate the steps shown can be implemented in practice as multiple individual operations. Further, the feedback management system 100 operates at least in part asynchronously in an event driven manner, and thus the steps shown in FIGS. 3a and 3b are to be understand as occurring in most cases in response to received signals or events, as will be clear from the context of the description.

300: The process generally starts with a customer accessing the feedback form 115 on the enterprise's website, entering information into the form, and submitting the form 115 via the front end web server 110. The server 110 passes the form variables to CGI script which generates an email addressed to the feedback manager 120 containing the form variables (e.g., customer comments, answers) and the additional environmental variables. This customer feedback email is sent via the email server 150 to the feedback manager 120.

302: The feedback manager 120 receives the customer feedback email and parses it to extract the passed variable information. Because the feedback manager 120 receives all feedback emails directly, whether they are received via the feedback form 115 or subsequently, the feedback manager 120 determines if there is already a tracking ID (TID) assigned to the customer's email; this indicates the customer has previously submitted a feedback to the system, and the present email is a further reply to a response provided an employee. This done by parsing the To: line of received email to determine if it contains a TID, such as in "TID@feedback.company.com". If so, then the feedback manager uses the TID to query the feedback database 125 for the email address of the employee who responded initially to the customer's email. The feedback manager 120 then generates an email containing the received customer email, and sends the generated mail to the employee. The status is set as Open.

304: Where there is no TID in the To: line of the received customer feedback email, then this indicates that the received email is the original customer submission via the feedback form 115. Accordingly, the feedback manager 120 creates a new database record in the feedback database 125, and assigns it a new TID. The database record preferably includes the content of the customer feedback message, and the customer email address where a reply is to be made.

306: The feedback manager 120 calls the feedback director 130 to obtain the email address of an employee, set of employees, or a group to whom the generated email is to be addressed, passing the feedback director 130 the TID for the customer email record in the database.

308: The feedback director 130 applies the routing rules 135 to determine one or more email address for routing the generated email. The feedback director 130 updates the database record with the selected email address(es) (or alternatively return the address(es) to the feedback manager 120, which in turn updates the feedback database 125).

310: The feedback manager 120 generates a new email to one or more employees, using the address(es) provided by the feedback director 130, or the extracted email address from the database 125. As indicated above, the email to the employee is generated using a template file 119. The template files 119 provide for standardized formatting for the emails to the employees (so that they can readily review and respond to the email) and variable fields for receiving the specific data from the feedback database 125 for this customer's feedback. The feedback manager 120 reads the appropriate template file 119 and inserts data from the database record into the email in the appropriate fields in the template. An alternative embodiment embeds the formatting and construction logic for generating the email directly in the feedback manager 120; however, this would require the feedback manager 120 to be recoded any time a change is to be made to the email content or format. The template approach is used to allow the templates to be easily edited without requiring changes to the feedback manager 120.

The feedback email template file 119 has the following general form. One example of a formatted email 400 is shown in FIG. 4.

a) Header-Addressing Fields

From: <TID@feedback.company.com>
customer@host.com
Reply-To: TID@feedback.company.com
To: employee@company.com
CC: feedback-α@feedback.company.com Here the From: line includes the tracking ID in the form of the sender's email address, as well as the customer's email address. This particular ordering, while not required, is beneficial because it allows the employee who receives the email to sort or group their inbox (or other folder into which these email are received or routed) by the sender's address, which thus operates to group by the tracking ID. Accordingly, an employee can easily structure a threaded view of the progress of handling a customer's particular feedback, since the TID will remain constant for all messages to and from the customer that originated with this TID.

b) Subject Field

The Subject field for the generated email contains the first N (e.g., N=32) characters of the customer's feedback. For example, in FIG. 4, the customer's comment in the feedback form is:

"I've been using Kayak for Air and Hotel and just now discovered that it's also useful for Car. Thanks so much!."

The Subject field 403 for the generated email, as shown in FIG. 4 is:

Subject: I've been using Kayak for Air and Hotel

This provides a convenient way to identify the subject or topic about which the customer is inquiring, since most customers start off their feedback with a specific question.

As a further refinement (illustrated in FIG. 4) the login name of the employee to whom the email is directed (or the group name) can be prepended to the subject line, and then formatted to indicate the manner in which the assignment was made. Where email has been assigned to an employee or group based on the content matching rules 135, the assigned employee login name (or group name) is prepended to the Subject line in square brackets. For example:

Subject: [dharris] I've been using Kayak for Air and Hotel

In this case, the subject line is prepended with the assigned employee login name "dharris" in brackets, followed by the first N characters of the customer's text comment.

Where assignment of the email was instead based on the scheduling and assignment history rules, the employee (or group) name is prepended in parenthesis. For example:

Subject: (dharris) I've been using Kayak for Air and Hotel

Formatting the subject line in this way serve several beneficial functions. First, prepending the employee (or group)

name serves to distinguish these customer support emails from other business or personal email that will be in the employee's inbox. Thus, the employee immediately knows, by simple visual inspection of his or her inbox, which emails are customer support related and have to be handled promptly, and which are not. This serves to further improves employee responsiveness.

Second, formatting the prepended name differentially based on how the assignment was made further informs the employee as the basis or reason he or she received the email. Receiving an email because of the content matching rules indicates that the email has an identified topic of concern and that employee has the best expertise in this area, for example, whereas receiving the email based on the scheduling rules indicates that the email was not in a known or identified topic area (at least with respect to the content matching rules) and thus may be more general nature, or for a new issue not previously addressed. This information is useful to the employee in deciding how and when to respond to the customer's support needs.

Of course, the particular formatting (e.g., square brackets, parenthesis, etc.) is arbitrary, and any other formatting convention may be used, such as font type, style (e.g., underlining, boldface), color, and so forth. In a further embodiment, the subject line can be formed without the name of the recipient, but still using the differential formatting based on which type of routing rule was used to select the employee. For example, a subject line could be either:

Subject: [pricing error]

where the recipient was selected using the content matching rules, or

Subject: (pricing error)

where the recipient was selected using the scheduling or assignment rules. Again, other types of formatting may be applied to different the assignment type.

c) Dynamic Status Image

The feedback manager 120 incorporates into the initial part of the email body the dynamic status indicator, as described above, which is will be rendered at the time the email is displayed (or previewed) in an employee's email client 162.

In one embodiment, the dynamic status indicator is an HTML image with the "src" attribute set to an internal URL associated with the TID for this customer message (e.g., inside.company.com/feedback/status/TID). The feedback manager 120 generates and stores an image file under the name "TID.jpg" with the status image for "Open" as this is the initial status of the customer's email. These image files can be stored in a directory configured for this purpose, e.g., a status directory; the images can alternatively be stored in simple database. As will be further described below, the URL will be resolved to the image at the time the email message is displayed to an image of the word "Open" or an image of the word "Active" (or other equivalent tags, tokens, icons, etc.), depending on the then current state of whether the email has been responded to by an employee. The mechanics of the resolution are described below. FIG. 4 illustrates an example of a dynamic status indicator 401 included in the body of an email.

Once the feedback manager 120 generates the email, it is sent, via the email server 150 to the designated employee or groups.

312: The email is maintained in the recipients' inboxes in a conventional manner. At some point, an employee uses the email client 162 to request the email be displayed. The request can take any manner of form, including selecting the email for opening and reading, or previewing it in a preview window (depending on the capabilities of the email client 162); the request can be made automatically by the email client 162 as well. At this point, the dynamic status indicator is resolved in the process of rendering the body of the email. The URL of the dynamic status indicator is passed to a CGI script (or other code process), which reads the TID value that is passed in, retrieves an image file "TID.jpg" from the storage repository (e.g., the status directory or database), and provides it to the email client for rendering. The rendered image will indicate whether the current issue is open or active.

If no other employee has responded to the email previously, then the retrieved image "TID.jpg" will be the "Open" image, and the email will be rendered accordingly. FIG. 4 illustrates a generated message after it has been displayed in the email client 162 and showing that the dynamic status indicator is resolved to the image of the word "Open".

If another employee has already responded to the email, the retrieved image "TID.jpg" will be the "Active" image, and the email will be rendered accordingly. FIG. 5 illustrates a generated message after it has been displayed in the email client and showing the dynamic status indicator 401 is resolved to the image of the word "Active." As noted above, the dynamic status indicator may be implemented in other structures besides image files.

312: At this point, the employee can simply press the standard "Reply" button in their email client to "reply" to a customer feedback. The employee can respond as he or she sees fit, including providing an answer to the customer's question, providing links to external information or the like. Because the "From" line had been set by the feedback manager 120 to "TID@feedback.company.com," the reply will be automatically addressed to the same address. As a result, the email server 150 will receive the email once it sent by the email client 162 and post it to the feedback manager 120.

314: Generally, the feedback manager 120 receives the reply email and performs additional formatting and correction, tracking, and other quality control and data gathering/mining operations before generating an actual response email to the customer. More specifically, this additional processing includes the following operations (the order of which is not essential). The reply is logged to the feedback database 125, by retrieving the associated record based on the TID, and indicating that a reply has been sent. The feedback manager 120 next stores an updated dynamic status indicator in the "TID.jpg" file, now with the "Active" indicator. A log can also be kept for each TID, or across all TIDs.

316: The feedback manager 120 then generates an actual response email that will be sent to the customer. FIG. 6 illustrates an example of a response email 600. Again, the feedback manager 120 uses one of the template files 119, which is structured as follows:

a) Header Fields

From:    <employee    name,    title> TID@feedback.company.com

To: customer@host.com

Here, the From: line includes as the email address the TID designated address, and the email display name is set to the name of the employee who is responding, and optionally includes the employee's title. The inclusion of the employee's name and title shows the customer that the email is indeed a personal response from an actual employee, and not merely a canned response. The employee name and title can be retrieved from lookup file, e.g., using LDAP directory lookup. The use of the TID designated address ensures that any further customer replies to this email will continue to be tracked by the feedback manager 120.

b) Subject Line

The subject line is formatted according to a rule, which is used to help the customer identify his or her original submission. In one embodiment, the subject line is indicates the date on which the customer's original feedback was sent, and the name of the company, so that the customer knows which business is contacting him. For example, the subject line could read:

Subject: Your feedback to Company on Mar. 3, 2006

The rules here are selected by the system administrator so that the company can decide how best to identify its employee responses.

c) Body

The body includes the employee response, as input by the employee. In one embodiment, at the end of the employee response there is included a question to the customer such as "Was this response helpful? Yes or No". The "Yes" and "No" responses are linked via respective URLs to the feedback management system 100, so the customer can optionally click on either the "Yes" or "No" link. Each URL invokes a CGI script at the web server 110, which records the customer rating in association with the TID; for example, this can be done by an update into the feedback database 125 based on the TID.

Finally, the body includes the customer's original feedback in standardized format. The body does not include the dynamic status indicator (even though this would have been physically included in the response from the employee that was received by the feedback manager 120); the feedback manager 120 removes the dynamic status indicator so that it not shown to the customer).

318: The response email is sent by the feedback manager 120 to the customer at the designated customer email address.

320: If the customer responds by email, the reply email is sent to the TID@feedback.company.com address. The email server 150 receives this customer reply email and routes it to the feedback manager 120, which begins processing at step 302 as described above. At this point, the customer's reply email does include a TID in the To: line, and accordingly, the feedback manager 120 can query the feedback database 125 for the email address of the employee who responded initially to the customer's email (so as to send the customer reply to this employee's email), as well as update the current message type (customer response), and then continue processing in the manner described above at step 310.

In a further embodiment the feedback management system 100 also allows employees to specify multiple communication systems by which they are to receive notification of a customer support inquiry; these systems include the legacy email system, an instant messaging system (e.g., AOL Instant Messenger, Trillian, MSN Messenger, Yahoo, etc.), a paging system, or telephone system. The employee can further define the order in which such notifications takes a place. In this embodiment, a routing rules 135 includes include an additional table that contains for each employee name, an ordered list of the notification contacts including the email name for the legacy email system, an instant messaging name, pager number, or telephone number; the list is ordered according to the employee's preference for the contact sequence. The feedback director 130 consults a contact list when it is present. The feedback manager 120 has an interface to an instant messaging system, paging system, telephone system, and can send the notification via these systems as well.

The present invention provides a fully functional and extensible customer support system within the context of a legacy email and web architecture. This provides several advantages over conventional customer support applications. First, by integrating the customer support capabilities directly within the email system, the enterprise does not have to purchase, maintain, and train employees to use a completely separate and independent customer support application, which typically includes dedicated server and client applications.

Second, by directing the customer support inquiries into the legacy email system, employees become immediately aware of customer support needs without having to access a separate application. This improves the level of responsiveness to customer inquiries.

Third, by allowing employees to respond to customer emails and yet have these responses still tracked by the feedback management system 100, employees become more focused on providing customer support in a timely manner, rather than having to switch contexts to another application, and manage the customer response from there. Instead, by having employee responses routed by email back through the feedback manager 120, the feedback manager 120 ensures consistent formatting, presentation, and issue tracking.

Fourth, the use of assignment based formatting of the subject lines enables employees to directly identify which emails in their inbox are customer-support related and which are not, further improving their ability to quickly respond to customer needs.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer implemented method of managing emails, the method comprising:
receiving from a sender a first email in an email system;
embedding in the first email a dynamic status indicator, the dynamic status indicator having a value that indicates whether a response to the first email has been made;
readdressing the first email to include a tracking identifier in the sender address;
receiving a request from a first email client to display the first email;
retrieving the dynamic status indicator associated with the first email, including a current value of the dynamic status indicator; and
providing to the first email client the first readdressed email with a current value of the dynamic status indicator embedded in the email.

2. The method of claim 1, wherein displaying in the first email client the first email with a current value of the dynamic status indicator embedded in the email comprises:
providing the email client with the current value of the dynamic status indicator indicating a first status where no recipient of the first email has made a response to the first mail; and
providing the email client with the current value of the dynamic status indicator indicating a second status where another recipient of the first email has made a response to the first mail.

3. The method of claim 2, wherein the first status is equivalent to an open status, and the second status is equivalent to an active status.

4. The method of claim 1, further comprising:
determining whether the first email has been assigned a tracking identifier;
responsive to the first email not having an assigned tracking identifier, assigning a new tracking identifier to the first email; and
associating the tracking identifier with the dynamic status indicator.

5. The method of claim 4, wherein associating the tracking identifier with the dynamic status indicator comprises storing the dynamic status indicator as a file having a file name corresponding to the tracking identifier.

6. The method of claim 4, wherein determining whether the first email has been assigned a tracking identifier comprises identifying the tracking identifier in a recipient's email address of the first email.

7. The method of claim 1, further comprising:
receiving a second email;
responsive to determining that the second mail is a response to the first email, updating the current value of the dynamic status indicator to indicate that a response to the first email has been made;
receiving a request from a second email client to display the first email;
retrieving the dynamic status indicator associated with the first email, including the current value of the dynamic status indicator indicating that a response has to the first email has been made; and
providing in the second email client the first email with a current value of the dynamic status indicator embedded in the first email.

8. The method of claim 1, further comprising: addressing the first email to a recipient using a plurality of routing rules.

9. The method of claim 8, wherein the routing rules include content matching rules, assignment history rules, and scheduling rules.

10. The method of claim 9, wherein the scheduling rules select a recipient for receiving an email according to distribution parameters, wherein the distribution parameters are preselected to obtain distribution of emails amongst potential recipients.

11. The method of claim 9, wherein the assignment history rules select a recipient for receiving an email according at least one previous assignment of an customer feedback email to a recipient.

12. The method of claim 1, further comprising:
receiving a customer feedback message via a web-based feedback form;
generating a customer feedback email from the customer feedback message; and
selecting a recipient to receive the customer feedback email based on a plurality of routing rules;
addressing the customer email to the selected recipient.

13. The method of claim 12, wherein generating a customer feedback message comprises:
generating a sender's email address for the customer feedback email, the sender's email address including the tracking identifier associated with a dynamic status image.

14. The method of claim 12, wherein generating a customer feedback message comprises:
generating a subject line for the customer feedback email, the subject line including a name associated with the recipient of the customer feedback email.

15. The method of claim 12, wherein generating a subject line comprises:
selecting for at least a portion of subject line, in response a type of routing rule used to select the recipient.

16. The method of claim 1, further comprising:
receiving a second email, the second email sent from a recipient of the first email;
identifying a tracking identifier in an email address of a recipient of the second email; and
obtaining an email address of a customer to whom to send the second email based on the tracking identifier; and
addressing the second email to the customer.

17. The method of claim 16, further comprising:
formatting a sender's address for the second email to include the tracking identifier.

18. The method of claim 16, further comprising:
formatting a sender's address for the second email to include a display name including a name and title of the recipient of the first email.

19. A computer implemented method of managing customer feedback using an email system, the method comprising:
identifying a customer feedback email being received at a designated email address;
readdressing the customer feedback email to include a tracking identifier in the sender address;
associating the tracking identifier with a feedback record in a feedback tracking database;
establishing for the tracking identifier a dynamic status indicator that indicates the status of whether a response has been made to the feedback email;
sending the readdressed customer feedback mail including its respective dynamic status indicator to at least one email recipient; and
responsive to a request from an email client of a recipient to access the customer feedback mail, determining a current value of the dynamic status indicator, and displaying the readdressed customer feedback email with the current value of the dynamic status indicator.

20. The method of claim 19, further comprising:
responsive to a response being made to a customer feedback email, updating the current value of dynamic status indicator associated with the feedback mail's tracking identifier to indicate that the response has been made; and
responsive to a request from another email client of a recipient of a customer feedback mail to access the customer feedback mail, displaying the email with the current value of the dynamic status indicator indicating that another recipient of the customer feedback email has made a response.

21. The method of claim 19, wherein determining a current value of the dynamic status indicator comprises:
determining the current value of the dynamic status indicator based on the tracking identifier associated with the dynamic status indicator.

22. The method of claim 19, wherein determining a current value of the dynamic status indicator comprises:
retrieving an image associated with the tracking identifier.

23. A customer feedback management system for an enterprise, the system stored in a computer-readable storage medium and comprising:
a feedback manager adapted to receive customer feedback emails, assign tracking identifiers to the customer feedback emails, readdress the customer feedback emails to include the tracking identifiers in the email addressing information, and send the readdressed customer feedback emails to employees of the enterprise;
a feedback director, coupled to the feedback manager, and adapted to receive from the feedback manager at least a portion of a customer feedback email, and provide the feedback manager with one or more email addresses of one or more employees to receive the readdressed customer feedback email; and
a feedback database coupled to the feedback manager to receive and store customer feedback emails in association with their assigned tracking identifiers.

24. A computer implemented method of providing an email to a recipient, comprising:
receiving an email addressed to an email management module;
selecting a recipient email using at least one of a plurality of routing rules, the selected routing rule having a type;
addressing the email to the selected recipient;
formatting at least a portion of a subject line of the email according to the type of the selected routing rule; and
transmitting the email to the address of the selected recipient.

25. A computer implemented method of managing customer feedback using an email system, the method comprising:
identifying a customer feedback email being received at a designated email address;
readdressing the customer feedback email to include a tracking identifier in the reply-to address;
associating the tracking identifier with a feedback record in a feedback tracking database;
establishing for the tracking identifier a dynamic status indicator that indicates the status of whether a response has been made to the feedback email;
sending the readdressed customer feedback mail including its respective dynamic status indicator to at least one email recipient; and
responsive to a request from an email client of a recipient to access the customer feedback mail, determining a current value of the dynamic status indicator, and displaying the readdressed customer feedback email with the current value of the dynamic status indicator.

* * * * *